United States Patent [19]

North

[11] 4,339,808

[45] Jul. 13, 1982

[54] ASYNCHRONOUS EVENT PRIORITIZING CIRCUIT

[75] Inventor: Robert P. North, Ithaca, N.Y.

[73] Assignee: Motorola, Inc., Schaumburg, Ill.

[21] Appl. No.: 127,003

[22] Filed: Mar. 4, 1980

[51] Int. Cl.[3] .............................................. G06F 9/46

[52] U.S. Cl. .................................... 364/900; 328/108; 328/154; 340/825.5

[58] Field of Search ... 364/200 MS File, 900 MS File; 340/147 LP, 825.5; 307/231, 247 R, 272 R, 443; 328/108, 152, 154

[56] References Cited

U.S. PATENT DOCUMENTS 3,543,242 11/1970 Adams, Jr. .......................... 364/200

4,121,285 10/1978 Chen .................................. 364/900

*Primary Examiner*—James D. Thomas

*Attorney, Agent, or Firm*—William E. Koch; Walt Nielsen

[57] ABSTRACT

A prioritizing circuit is provided for arbitrating between asynchronously occurring memory access request and memory refresh request signals to a dynamic RAM memory module. The circuit includes a latch circuit (20), a latch control circuit (21), and priority logic (22). The latch circuit is responsive to the request signals and latches the state of both signals upon receipt of a strobe signal generated by the latch control circuit. The latch control circuit generates the strobe signal upon detection of the first access request signal transmitted to the latch circuit at a predetermined logic level. To arbitrate priority between request signals occurring substantially simultaneously, the priority logic includes a combinatorial logic network responsive to the outputs of the latch circuit for generating a grant signal corresponding to the request signal having the higher priority. A delay circuit (23) provides a delayed strobe signal input to the priority logic, so that the combinatorial logic is only enabled after an appropriate settling time.

4 Claims, 5 Drawing Figures

ASYNCHRONOUS EVENT PRIORITIZING CIRCUIT

TECHNICAL FIELD

This invention relates generally to the field of digital logic circuits and, more particularly, to a prioritizing circuit for arbitrating among a plurality of service request signals.

BACKGROUND ART

In an asynchronous digital logic system, the various input, intermediate, and output signals do not occur in a clocked relationship with respect to one another. In a data processing system having an asynchronous bus and employing a dynamic RAM memory certain timing errors are likely to occur as a result of a lower priority RAM refresh request occurring just prior to a higher priority memory access request. It is known that dynamic RAM memories require periodic refreshing to maintain the data which is stored in them. Prior art prioritizing circuits have been unable to eliminate timing errors occurring when a refresh request occurs at approximately the same time as a memory access request. Such timing errors may severely affect the reliability of the RAM memory module.

For example, if a refresh request occurs immediately before an access request, the system priority logic may generate a brief refresh grant signal prior to generating an access grant signal. Consequently, the memory module may attempt a refresh operation and, before conclusion of the refresh operation, also attempt a memory access operation. As a consequence neither operation may be successfully performed.

It is therefore desirable to eliminate timing errors arising from closely occurring memory access and memory refresh request signals in an asynchronous data processing system employing a dynamic RAM memory module in order to improve the reliability of such system.

BRIEF SUMMARY OF THE INVENTION

It is therefore an object of the present invention to eliminate timing errors resulting from closely occurring memory access and memory refresh request signals in an asynchronous data processing system employing a dynamic RAM memory module.

It is also an object of the present invention to prioritize simultaneously occurring memory access and memory refresh requests in an asynchronous data processing system employing a dynamic RAM memory module.

These and other objects of the invention are achieved in accordance with a preferred embodiment of the invention by providing a prioritizing circuit responsive to a plurality of asynchronously occurring request signals, such circuit comprising a latch circuit responsive to the request signals and to a control signal, the latch circuit latching the request signals upon receipt of the control signal, a latch control circuit responsive to a predetermined logic level of one or both of the output signals for generating the control signal, and a priority circuit responsive to the output signals for prioritizing the one or more output signals having the predetermined logic level and generating a grant signal corresponding to the output signal having the highest priority.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1:
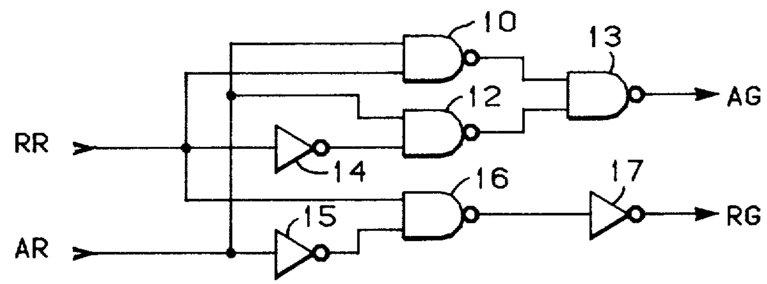
FIG. 1 shows a logic diagram of a prior art circuit for prioritizing a memory access request and a memory refresh request in an asynchronous data processing system employing a dynamic RAM memory module.

FIG. 1 shows a prior art priority circuit which consists of combinatorial logic including NAND gates 10, 12, 13, and 16 and inverters 14, 15, and 17. The prior art priority circuit is responsive to an access request signal (AR) and to a refresh request signal (RR), and it generates an access grant signal (AG) or a refresh grant signal (RG), depending upon whether signals AR and RR are present singly or in combination. If either signal AR or signal BR is present alone, the priority circuit generates a corresponding AG signal or RG signal respectively. If both signals AR and RR are present, the priority logic will generate only signal AG, since the combinatorial logic of the priority circuit provides higher priority to an access request than to a refresh request.

Figure 2:
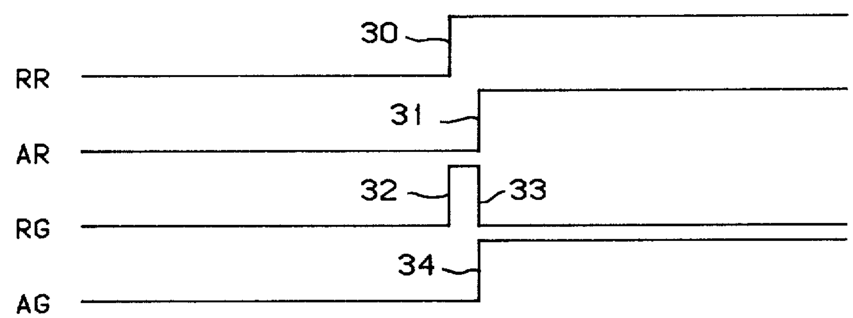
FIG. 2 illustrates a timing diagram useful in explaining the operation of the prior art circuit shown in FIG. 1.

With reference to FIG. 2, which shows a timing diagram illustrating the operation of the prior art priority circuit of FIG. 1, it will be seen that when the refresh request signal (RR) goes high (i.e., at point 30) ahead of the access request signal (AR) (i.e., at point 31), a short duration refresh grant (RG) pulse is generated ahead of a longer duration access grant (AG) pulse. The refresh grant pulse rises at point 32 and falls at point 33. The access grant rises at point 34 coincides with the falling of the refresh grant pulse.

In an asynchronous system, such as a data processing system, employing a dynamic RAM memory module, in which further circuitry (not shown) is responsive to the access grant AG and refresh grant RG signals, the short duration RG pulse generated by the prior art priority circuit under the conditions shown in FIG. 2 may cause improper operation of the system. The RAM memory module may first attempt a refresh operation and then, upon receipt of the higher priority access grant signal, attempt a memory access operation. As a consequence, neither the refresh operation nor the access operation may be successfully accomplished. The present invention overcomes the problem of spurious or indefinite refresh grant signals being generated in the environment described above. It also has utility in other circuits and systems wherein priority must be arbitrated among a number of competing servce request signals.

Figure 3:
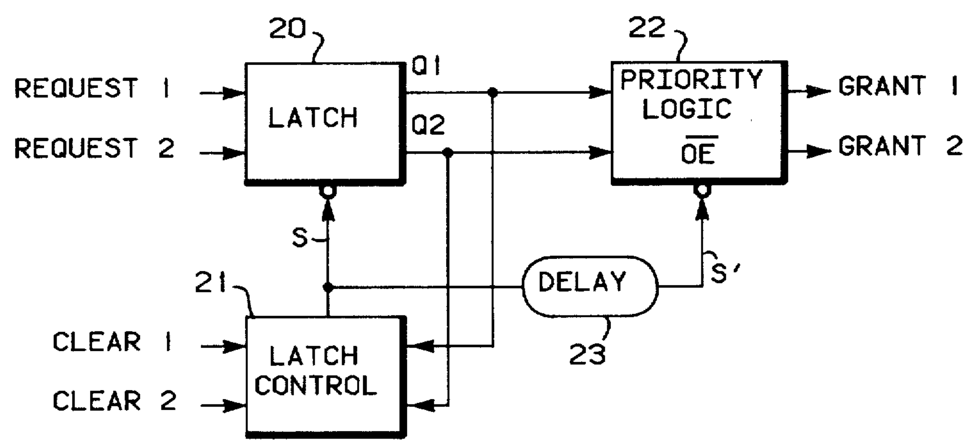
FIG. 3 illustrates a block diagram of the asynchronous event prioritizing circuit of the present invention.

With reference now to FIG. 3, a block diagram of the present invention is shown. The invention comprises a latch 20 which is responsive to a pair of asynchronously occurring request signals, REQUEST 1 and REQUEST 2. The latch circuit 20 in a preferred embodiment is an MC6882B/MC3482B octal 3-state buffer/latch available from Motorola, Inc. Latch 20 has a pair of output Q1 and Q2 corresponding to the REQUEST 1 and REQUEST 2 signals, respectively, and it has a strobe input responsive to a strobe signal S generated by the latch control circuitry 21. When the strobe input is high, the outputs of latch 20 reflect the current signal levels of the corresponding inputs, and when the strobe signal is low, the outputs of the latch 20 are latched up to reflect the logic levels of the latch inputs at the time the strobe signal went low. When the strobe input is low, further changes in the latch inputs have no effect upon the latch outputs.

Latch control circuit 21 is responsive to the outputs Q1 and Q2 of latch 20. When latch control circuit 21 detects a transition (e.g., a low-to-high transition) in either of latch outputs Q1 and Q2, reflecting the presence of a corresponding request signal, latch control circuit 21 immediately generates the strobe signal S to the strobe input of latch 20, thereby latching the outputs of latch 20. Because of inherent gate delays in the latch control circuitry 21, it is possible that the other output of latch 20 may also make a transition before latch control 21 can generate the strobe signal S to latch the output of latch 20.

To arbitrate between simultaneously occurring latch outputs Q1 and Q2, priority logic 22 includes combinatorial logic for determining which request has the higher priority and for generating a corresponding grant signal in the form of GRANT 1 or GRANT 2. Priority logic 22 is responsive to a delayed strobe signal S' at its output enable ($\overline{\text{OE}}$) control input. The strobe signal S generated by latch control circuit 21 is delayed in an appropriate delay means 23 to provide the delayed strobe signal S'. The application of signal S' to the $\overline{\text{OE}}$ control input of priority logic 22 permits the propagation of the request signals through the latch circuit 20 before the outputs of priority logic 22 are enabled.

The priority circuit of the present invention is further responsive to a pair of "clear" signals, CLEAR 1 and CLEAR 2, which are associated with the respective request signals. The clear signals are used to disable the latch 20 to allow it to be responsive to further request signals. For example, if a REQUEST 1 signal were present and gave rise to a GRANT 1 signal, upon conclusion of an appropriate servicing operation by circuitry not shown in response to the REQUEST 1 signal, a CLEAR 1 signal is generated to the latch control circuitry 21, causing the strobe signal S to revert to its inverse state, thereby disabling the latch 20.

It should be apparent that the asynchronous event prioritizing circuit shown in block diagram form in FIG. 3 overcomes the problem of the prior art prioritizing circuit, since the circuit of the present invention is capable of arbitrating between closely occurring or simultaneously occurring request signals and of generating a grant signal corresponding to the request signal having the higher priority. Once the grant signal is generated, all subsequently occurring request signals are ignored until the prioritization circuit has been cleared by an appropriate clear signal corresponding to the request signal which was accorded priority.

Figure 4:
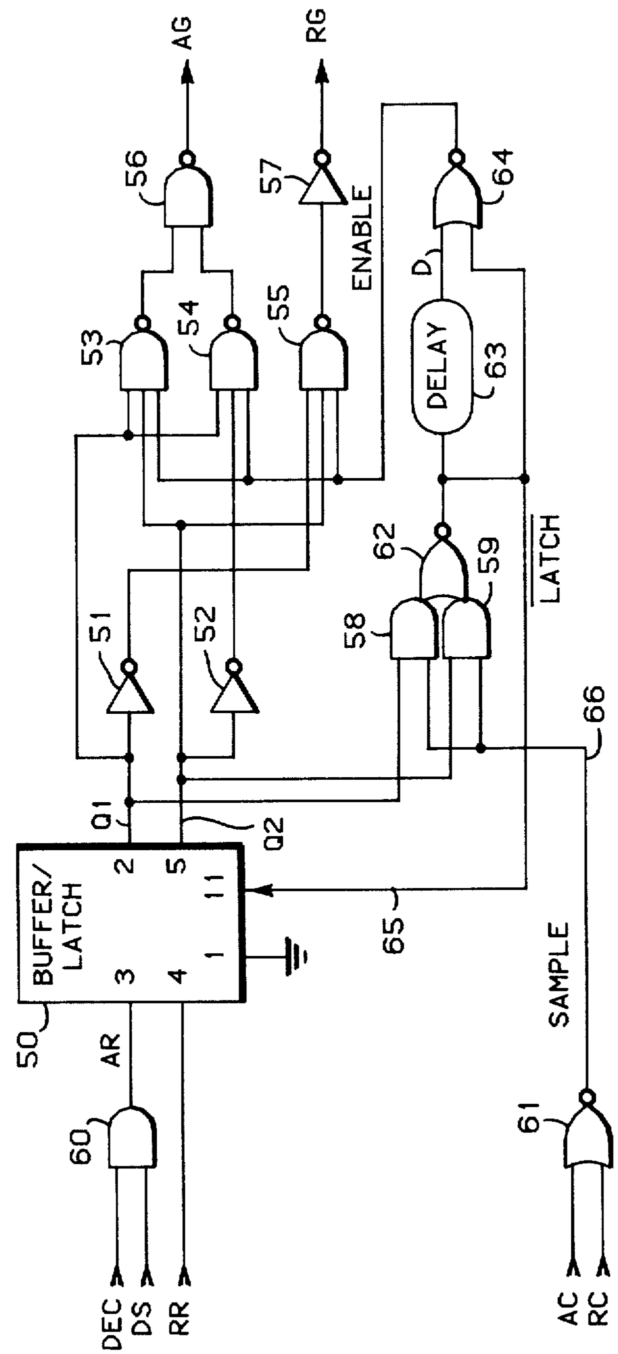
FIG. 4 illustrates a detailed logic diagram of a preferred embodiment of the asynchronous event prioritizing circuit shown in FIG. 3.

FIG. 4 illustrates a detailed logic diagram of a preferred embodiment of the present invention. The buffer/latch 50 of FIG. 4 corresponds to latch 20 of FIG. 3. NOR gate 61 and the AND-NOR gate comprising AND gates 58 and 59 and NOR gate 62 represent the implementation of the latch control circuit 21 in FIG. 3. The combinatorial logic of FIG. 4, represented by inverters 51, 52, and 57, and by NAND gates 53—56, serves as the priority logic 22 of FIG. 3, while NOR gate 64 serves as the output enable control of the priority logic 22 shown in FIG. 3.

AND gate 60 merely serves an input logic function, in that it generates the AR signal only when an address decode signal DEC and a data strobe signal DS are simultaneously present. The DEC and DS signals are shown merely for illustrative purposes within the context of a preferred embodiment of the invention, and it will be understood that the AR signal may be generated in response to greater or fewer system conditions.

The AR signal is connected to pin 3 of the buffer/latch 50, which as mentioned above represents an MC6882B/MC3482B device in a preferred embodiment. The RR signal is applied to pin 4. Pin 1, representing the output enable connection of the buffer/latch 50, is tied to ground. Pin 11 represents the $\overline{\text{LATCH}}$ input and is connected to line 65 over which the $\overline{\text{LATCH}}$ signal is generated from NOR gate 62. Pins 2 and 5 represent the output pins over which output signals Q1 and Q2, corresponding to inputs AR and RR, respectively, are generated (assuming that the $\overline{\text{LATCH}}$ signal is high).

NOR gate 61 is responsive to a pair of clear signals, AC and RC, which are associated with signals AR and RR, respectively, and NOR gate 61 generates a SAMPLE output over line 66 which is distributed to AND gates 58 and 59. AND gates 58 and 59 receive as additional inputs thereto the buffer/latch output signals Q1 and Q2, respectively. The output of NOR gate 62 is transmitted, as previously mentioned, to the $\overline{\text{LATCH}}$ input pin 11 of buffer/latch 50. In addition, the output of NOR gate 62 is delayed by a suitable delay device 63, which may be implemented by any of several well known delay means, such as a series of inverters, a shift register, etc. The output D of the delay 63 is applied as one input to NOR gate 64. The $\overline{\text{LATCH}}$ signal is applied as an additional input to NOR gate 64, and the ENABLE output of NOR gate 64 is distributed to each of NAND gates 53-55.

The Q1 output of buffer/latch 50 is applied as one input to each of NAND gates 53 and 54. The Q1 output is also inverted by inverter 51 and applied as an input to NAND gate 55. The Q2 output is applied as an additional input to NAND gates 53 and 55. The Q2 output is inverted by inverter 52 and applied as an additional input to NAND gate 54. The outputs of NAND gates 53 and 54 are transmitted as inputs to NAND gate 56, and the output of NAND gate 56 represents the access grant signal AG. The output of NAND gate 55 is inverted by inverter 57, whose output represents the request grant signal RG.

Figure 5:
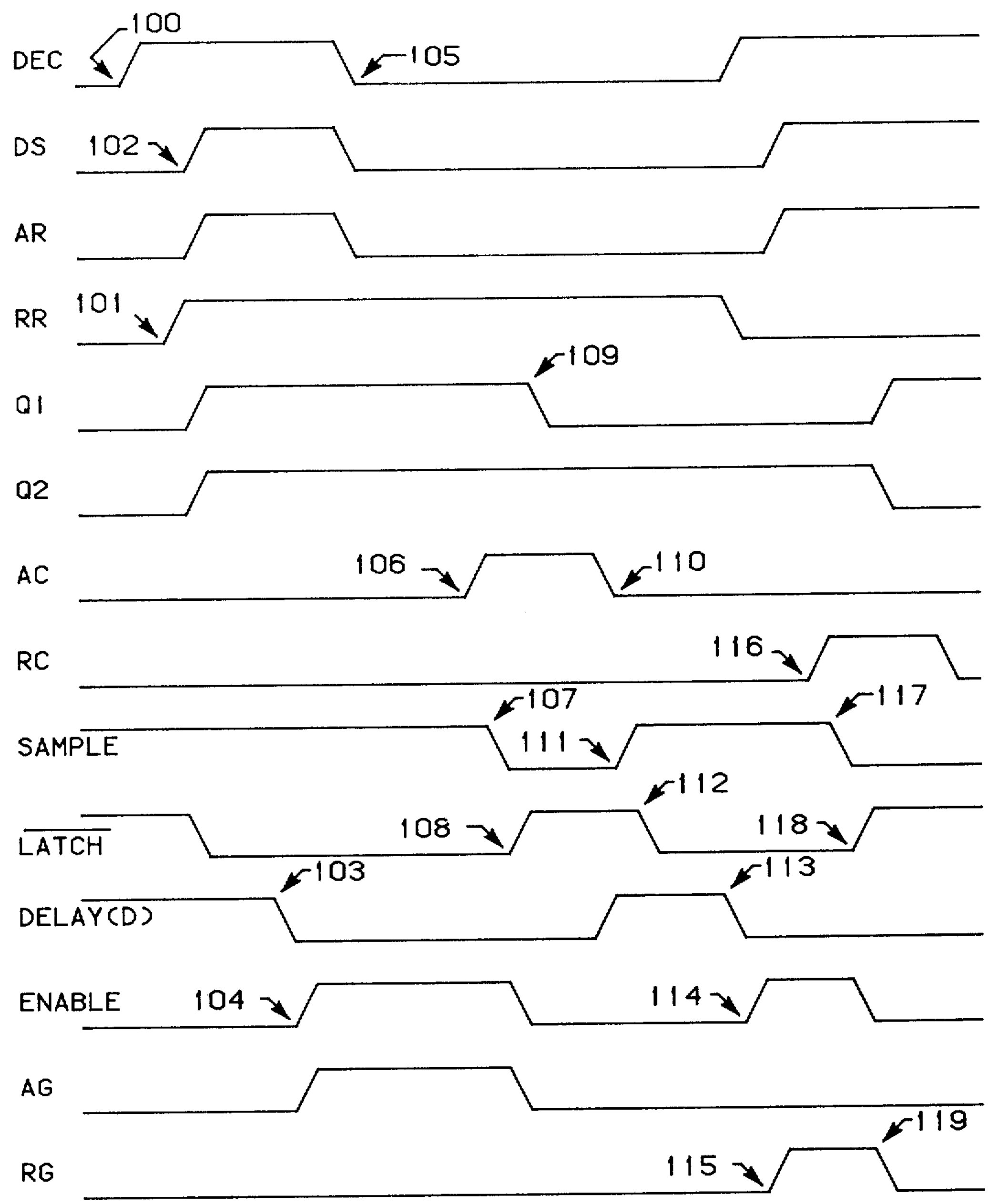
FIG. 5 illustrates a timing diagram useful in explaining the operation of the embodiment of the invention shown in FIG. 4.

The operation of the preferred embodiment illustrated in FIG. 4 will now be explained with reference to the timing diagram shown in FIG. 5. Let us assume that in a data processing system in which the present invention may be employed the address decode signal DEC goes high at time 100 and that the data strobe signal DS goes high at time 102. Accordingly, the output AR of AND gate 60 also goes high at time 102. Let us further assume that the memory refresh signal RR rises as time 101, which is very shortly before signal AR rises.

The initial state of the $\overline{LATCH}$ signal is high following a "clear" operation, which will be explained in greater detail below. Output signal Q1 of buffer/latch 50 goes high at time 102 when input signal AR goes high. Output signal Q2 goes high at time 101 when input signal RR goes high. When output signal Q2 goes high, AND gate 59 goes high, and the output of NOR gate 62, represented by the $\overline{LATCH}$ signal, goes low, thereby latching the outputs of buffer/latch 50. Because of propagation delays in the generation of the $\overline{LATCH}$ signal, the Q1 output is also latched high, even though the corresponding input AR went high after input signal RR went high. Thus, both outputs Q1 and Q2 are latched high. However, this is of no consequence, since the combinatorial logic of the circuit arbitrates the priority between the outputs Q1 and Q2 of buffer/latch 50 as will be explained below.

The output D of delay 63 falls at time 103, which is a short predetermined time after the $\overline{LATCH}$ signal falls. As signal D falls, the ENABLE output of NOR gate 64 rises, thereby enabling AND gates 53–55. NAND gate 53 of the combinatorial logic goes low, since its three inputs are all high, and consequently the output AG of NAND gate 56 goes high. Signal AG represents the access grant signal and is transmitted to appropriate circuitry associated with the RAM memory module to permit a memory access cycle to be undertaken. The output of NAND gate 55 remains high, since the output of inverter 51 is low. The high output of NAND gate 55 is inverted by inverter 57, so that signal RG remains low and does not rise, even momentarily, to precipitate a false memory refresh operation.

When the memory access operation has concluded, the access clear signal AC rises at time 106. This causes the SAMPLE signal to fall at time 107. When the SAMPLE signal falls, the $\overline{LATCH}$ signal rises at time 108. In response to the SAMPLE signal going low at time 107, the $\overline{LATCH}$ signal rises at time 108 and simultaneously the ENABLE signal falls, so that the AG signal also falls at time 108. When the $\overline{LATCH}$ signal goes high at time 108, the Q1 output of the buffer/latch 50 is released at time 109, since the AR input to the buffer/latch 50 is now at a low logic level.

When the AC signal goes low at time 110, the SAMPLE signal rises at time 111, and accordingly the $\overline{LATCH}$ signal falls at time 112, thereby latching output Q1 in a low logic state and output Q2 in a high logic state. When delay signal D falls at time 113, the ENABLE signal rises as shown at time 114. When the ENABLE signal is high, the combinatorial logic permits output signal RG to be generated at time 115.

At time 116 the RC signal goes high, causing the SAMPLE signal to fall at time 117, and the $\overline{LATCH}$ signal to rise at time 118. When the $\overline{LATCH}$ signal rises at time 118, the ENABLE signal falls thereby causing the RG signal to fall at time 119.

It will be apparent to those skilled in the art that the disclosed Asynchronous Event Prioritizing Circuit may be modified in numerous ways and may assume many embodiments other than that specifically set out and described above. For example, any number of input request signals may be serviced by appropriately extending the concepts herein disclosed. In addition, the present invention has utility beyond the particular application herein disclosed, and it may be used in conjunction with other types of asynchronous systems.

Accordingly, it is intended by the appended claims to cover all modifications of the invention which fall within the true spirit and scope of the invention.

What is claimed is:

1. A prioritizing circuit responsive to a plurality of asynchronously occurring request signals, said circuit comprising:

- a latch circuit responsive to said request signals and to a control signal, said latch circuit generating a plurality of output signals each having a logic level related to that of a respective one of said request signals when said control signal is in a first logic state and latching said output signals when said control signal is in a second logic state;
- a latch control circuit responsive to a predetermined logic level of said output signals for generating said control signal in said second logic state;
- delay means responsive to said control signal for generating a delayed control signal; and
- a priority circuit responsive to said output signals and said delayed control signal, for prioritizing said plurality of output signals having said predetermined logic level and generating a grant signal corresponding to the output signal having the higher priority.

2. The circuit recited in claim 1, wherein said latch control circuit is further responsive to a plurality of clear signals, each associated with a respective one of said request signals, said latch control circuit generating said control signal in said first logic state upon receipt of the clear signal associated with said request signal corresponding to said grant signal.

3. The circuit recited in claim 2, wherein said latch control circuit further comprises:

- a first NOR-type gate responsive to said plurality of clear signals and generating a sampling signal;
- a plurality of AND-type gates, each responsive to said sampling signal and to a respective one of said output signals and each generating a logic output; and
- a second NOR-type gate responsive to the logic outputs of said plurality of AND-type gates and generating said control signal.

4. The circuit recited in claim 3 wherein said priority circuit comprises:

- a third NOR-type gate responsive to said control signal and to said delayed control signal and generating an enabling signal; and
- combinational logic responsive to said output signals and to said enabling signal for prioritizing said one or more output signals having said predetermined logic level, upon receipt of said enabling signal, and generating said grant signal.

* * * * *